April 30, 1935.   R. MILLER ET AL   1,999,967
VALVE MECHANISM
Filed March 29, 1933   2 Sheets-Sheet 1

INVENTORS
Ralph Miller
And Wallace K. Newcomb.
BY
THEIR ATTORNEY.

April 30, 1935.  R. MILLER ET AL  1,999,967
VALVE MECHANISM
Filed March 29, 1933  2 Sheets-Sheet 2

INVENTORS
Ralph Miller
And Wallace K. Newcomb
BY
THEIR ATTORNEY.

UNITED STATES PATENT OFFICE 1,999,967

VALVE MECHANISM

Ralph Miller and Wallace K. Newcomb, Easton, Pa., assignors to Ingersoll-Rand Company, Jersey City, N. J., a corporation of New Jersey Application March 29, 1933, Serial No. 663,337

3 Claims. (Cl. 277—45)

This invention relates to valve mechanisms, and more particularly to a valve mechanism for the fuel injection line of an internal combustion engine and into which the fuel is injected under high pressure.

One object of the invention is to assure uniformly meted fuel charges to the combustion chamber of the engine.

Another object is to prevent after-injection and the consequent wastage of fuel and such undesirable conditions as usually result through the incorrect proportioning of the constituent elements of the explosive mixture, including smoke laden exhaust gases and the deposition of carbonaceous material on the elements exposed to the exhaust gases.

Still another object is to prevent the objectionable hydraulic-hammer caused by the pressure waves which are set up in the fuel injection line upon the abrupt interruption of communication between the fuel under pressure in the injection line and the pumping mechanism.

Other objects will be in part obvious and in part pointed out hereinafter.

Figure 1:
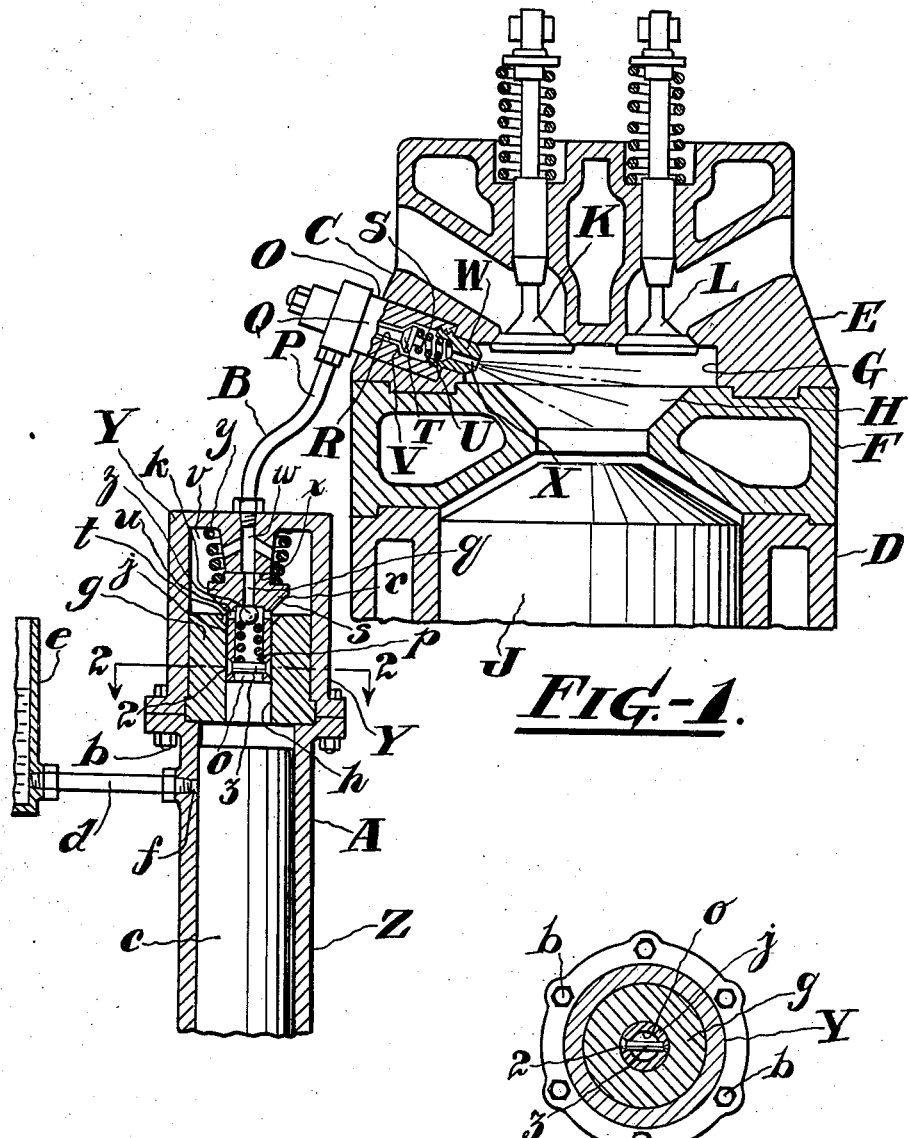
Figure 2:
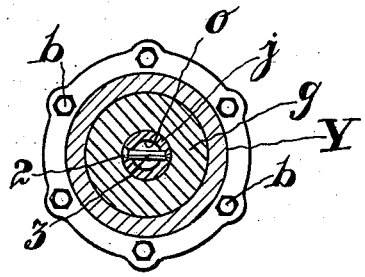
Figure 3:
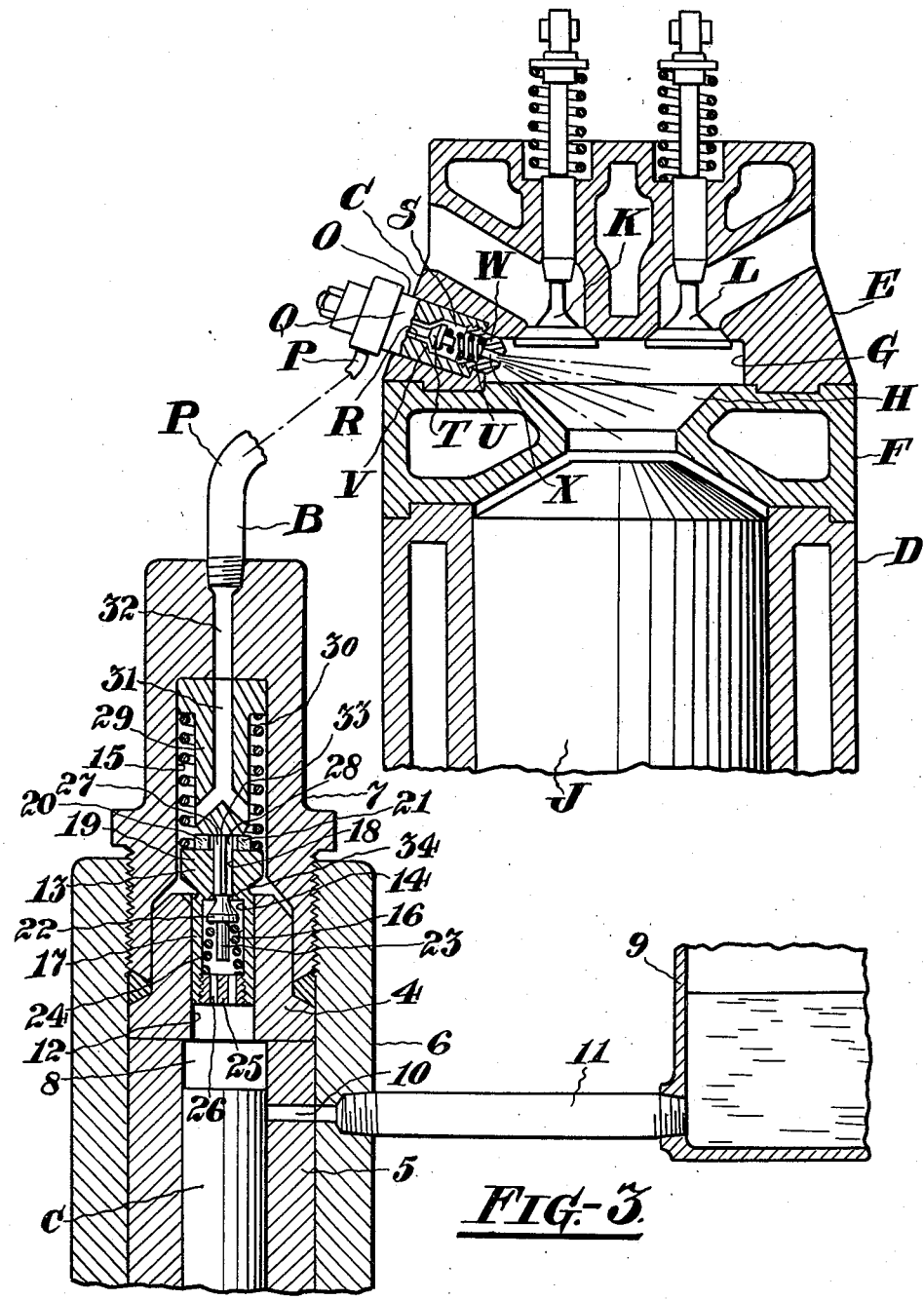

In the accompanying drawings illustrating the invention and in which similar reference characters refer to similar parts, Figure 1 is a sectioinal elevation of a valve mechanism constructed in accordance with the practice of the invention and showing it interposed in the fuel injection line of an internal combustion engine, Figure 2 is a transverse view taken through Figure 1 on the line 2—2 looking in the direction indicated by the arrows, and Figure 3 is a view similar to Figure 1 showing a modified form of the invention.

Referring more particularly to the drawings, A designates, in general, a valve mechanism interposed in a fuel line B of an internal combustion engine C.

The engine C comprises a cylinder D and a head E with a spacer F interposed between the cylinder and the head and the interior of which combines with a recess G in the head E to form a combustion chamber H wherein the fuel charge is prepared and ignited for actuating a piston J reciprocable in the cylinder D.

Within the head E are the usual exhaust and inlet valves K and L, respectively, and seated in the wall of the head E is an injection nozzle O to which is connected an end of an injection line or pipe P leading from the valve mechanism A.

The injection nozzle O may be of a well known type comprising a nozzle body Q which may be affixed to the head E in any suitable manner and has a passage R extending therethrough for conveying fuel to the combustion chamber H. The outer end of the passage R may be in direct communication with the injection line P. At the inner end of the passage is an enlarged portion S to accommodate a valve T which controls communication between the passage R and the enlarged portion S.

Within the enlarged portion S is a spring U which acts against the valve T for pressing the valve to its seat V, and the opposite end of the spring is seated upon a spray nozzle W threaded into the inner end of the nozzle body and having an aperture X through which the fuel flows from the enlarged portion S into the combustion chamber H.

The valve mechanism A, constructed in accordance with the practice of the invention, comprises a casing Y which, in this instance, is connected directly to the end of a pump cylinder Z, as by bolts $b$, so that the fuel pumped by a plunger $c$ within the cylinder Z is discharged directly into the casing Y. Such fuel is introduced into the pump cylinder by a pipe $d$ leading from a source of fuel supply $e$ and communicating with the cylinder Z through a port $f$, said port $f$ being suitably located to assure complete filling of the cylinder Z during the suction stroke of the plunger $c$.

The plunger $c$ may be actuated, for a reciprocatory movement, in any suitable manner, as by a cam shaft (not shown), but which may be operatively connected with the crank shaft of the engine to cause the cam shaft to move in timed relation with the piston or pistons J of the engine.

Within the casing Y is a bushing or guide member $g$ having a bore $h$ which serves as a guide for the stem $j$ of a valve $k$. The stem $j$ is of cylindrical shape and has an unbroken external surface which cooperates with the wall of the bore $h$ to prevent the passage of fuel through said bore. Within the valve $k$ and its stem is a passage $o$ comprising an enlarged portion $p$, which is located in the stem $j$, and a port $q$ in the head $r$ of the valve $k$.

The valve $k$ is preferably of the poppet type having a surface $s$ which seats upon a valve seat $t$ on the guide member $g$, and at the juncture of the surface $s$ and the stem $j$ are a plurality of laterally directed ports $u$ through which fuel flows from the enlarged portion $p$ of the passage $o$ into a discharge chamber $v$ in the top of the casing Y. The fuel thus introduced into the chamber $v$ passes therefrom to the injection line P through a passage or passages $w$ located in the top of the casing Y and in a stop member $x$ depending from the upper end of the casing Y to limit the lift of the valve $k$.

In order to insure the prompt closing of the valve $k$ upon completion of the pumping stroke of the plunger $c$ a spring $y$ is disposed about the stop member $x$ to seat with one end against the end wall of the casing Y and with its other end against the head $r$ of the valve.

As will be readily understood, the valve $k$ is, in effect, a discharge valve for the fuel pump. The valve is actuated by the fuel pumped to the injection nozzle of the engine C and closes promptly upon completion of the pumping stroke of the plunger $c$. This closing movement of the valve $k$ is effected by the fuel under pressure within the passages and chambers lying between the valves $k$ and T and by the force of the spring $y$.

In devices of this character wherein the fuel is injected into the combustion chamber under high pressure the swift returning or closing movement of the valve $k$, permits rapid expansion of the fuel under pressure, between the valves $k$ and T, which causes pressure waves of such magnitude as to cause unseating of the valve T. The column of fuel between the valves $k$ and T may then expand into the enlarged portion S of the passage R and through the injection nozzle into the combustion chamber H.

After-injection is, of course, objectionable. It not only causes wastage of fuel but, being injected into the combustion chamber after substantially all the oxygen therein has been consumed, it also causes smoke laden exhaust gases and the objectionable consequences incident thereto. The present invention is particularly contemplated to obviate these objectionable occurrences. To this end a check valve $z$, in the form of a ball, is disposed within the enlarged portion $p$ of the passage $o$ to seat over the port $u$ at its juncture with the portion $p$. The valve $z$ is held in the closed position over the mouth of the port $u$ by a spring 2 disposed in the portion $p$ and seating with its other end against a spring seat 3, illustrated as being in the form of a pin which extends transversely through the passage $o$ and is preferably piened over at its ends to prevent endwise movement thereof.

The operation of the device is as follows: Upon the subjection of the end of the valve stem $j$ to the pressure of the fuel being pumped by the plunger $c$ the valve $k$ is lifted against the stop member $x$. In this position of the valve the ports $u$ are uncovered to communicate the passage $o$ with the chamber $v$. The fuel, under pressure, then flows through these channels and through the port or ports $w$, the injection line P and into the passage R in the nozzle body Q where it unseats the valve T and passes through the enlarged portion S and the aperture X into the combustion chamber H in the form of a spray.

Immediately upon completion of the pumping stroke of the plunger $c$ the valve $k$ is returned to its seat $t$ by the spring $y$ and the pressure of the fuel existing in the injection line P and the chamber $v$. As the valve $k$ approaches or strikes its seat the pressure of the fuel lying between the valves $z$ and T causes the valve $z$ to open and the fuel will then expand into the space existing between the valve $z$ and the end of the plunger $c$.

In the form of the invention illustrated in Figure 3 a guide member 4 is seated upon the end of a sleeve or bushing 5 inserted in a pump cylinder 6 and is held fixedly in position by a casing 7 threaded into the end of the cylinder 6. The interior of the bushing 5 constitutes a pump chamber 8 which communicates with a source 9 of fuel supply through a passage 10, in the bushing and the cylinder, and a pipe 11.

Within a bore 12 in the guide member 4 is a plunger 13 which cooperates with the wall of the bore 12 to prevent the flow of fuel through said bore. A passage, designated in its entirety by 14, extends longitudinally through the plunger 13 to convey all the fuel pumped by the plunger $c$ into a chamber 15 in the casing 7. The passage 14 comprises an enlarged portion 16, located in a stem 17 of the plunger, and a reduced portion 18 in the head 19 of the plunger 13. The portion 18 opens directly into the chamber 15 through a series of radial grooves 20 defined by lugs 21 on the free end of the head 19 of the plunger 13.

Disposed within the passage 14 is a valve 22, of the poppet type, which controls communication between the enlarged portion 16 and the reduced portion 18 of the passage 14. On one end of the valve 22 is a cylindrical extension 23 which acts as a guide for a spring 24 seated against the valve 22 and against a plug 25 threaded into the end of the enlarged portion 16. The plug 25 is provided with passages 26 to afford communication between the pumping chamber 8 and the passage 14.

On the opposite end of the valve 22 is a stem 27 having longitudinally extending flutes 28 in its periphery for conveying the fuel to the grooves 20. The stem 27 is of such length that when the valve 22 is held in the closed position by the spring 24 the said stem 27 extends beyond the adjacent end of the plunger 13.

A suitable abutment is provided for the projecting end of the stem 27 in the form of a stop member 29 disposed fixedly in the chamber 15 and against the end wall of which it may be held by a spring 30 seated upon the head 19 of the plunger 13. Within the stop member 29 is a passage 31 that opens into a passage 32 in the end of the casing 7, and into the outer end of the passage 32 is threaded an end of the injection line P whereby the fuel is conveyed to the injection nozzle O.

In this form of the invention, as in that previously described, the valve disposed within the movable element is constantly exposed to the fuel column lying between said valve 22 and the valve T in the injection nozzle. The pressure area of the valve thus exposed is equal to the area of the restricted portion 18 of the passage 14. A portion of the pressure area, designated 33, is provided by the free end of the stem 27 and other portions, designated 34, are located on the valve 22 and are of a number equalling the number of flutes in the stem 27 and of substantially the same area as the cross sectional areas of the flutes 28.

The operations of this form of the invention briefly described is as follows: During the pumping stroke of the plunger $c$ the fuel acting against the plunger 13 raises said plunger and, inasmuch as the valve 22 is encased thereby, the plunger 13 will also carry the valve 22 upwardly in the direction of the stop member 29. As the plunger 13 and the valve 22 proceed upwardly the end of the stem 27 will abut the stop member 29 and the plunger 13 will continue in an upwardly direction until the lugs 21 seat against the stop member. In this way the valve 22 will be opened. The fuel under pressure may then pass through the ports 26 to the passage 14 into the chamber 15. From there the fuel flows through the passages 31, 32, the injection pipe P and through the injection nozzle W into the combustion chamber.

Upon the reverse stroke of the plunger c the fuel under pressure lying between the valves 22 and T together with the spring 30 will immediately return the plunger 13 to its seat. During this downward movement of the plunger 13 the passage 18 may be momentarily closed by the valve 22 but will again be opened by the expansive force of the fuel column between the valve 22 and the valve T, thus permitting such fuel to expand and flow back into the pump chamber 8 instead of unseating the valve T and causing the objectionable conditions which the present invention is contemplated to prevent.

We claim:

1. A valve mechanism for a fuel injection line, comprising a casing having a discharge passage, a discharge conduit in constant communication with the discharge passage, a guide member in the casing having a bore, a valve in the bore having an internal passage and being actuated by fuel under pressure to admit fuel from the passage to the injection line, a stem on the valve extending into the bore to guide the valve and to prevent the passage of fuel through the bore, said valve having a port to permit the return flow of fuel from the injection line to the passage, and a valve to control the port.

2. A valve mechanism for a fuel injection line, comprising a guide member having a bore, a plunger in the bore actuated by fuel under pressure and having an internal passage to convey fuel to and from the injection line, said plunger having an unbroken external surface to prevent the passage of fuel through the bore, a valve in the plunger to control the passage and being carried by the plunger, and a fixed stop member against which the valve abuts to open the passage for admitting fuel to the injection line.

3. A valve mechanism for a fuel injection line, comprising a guide member having a bore, a plunger in the bore actuated by fuel under pressure and having an internal passage to convey all the fuel to and from the injection line, said plunger having an unbroken external surface to prevent the passage of fuel through the bore, a valve in the plunger to control the passage and being carried by the plunger, a fixed stop member against which the valve abuts to open the passage for admitting fuel to the injection pipe, and a pressure area on the valve against which the fuel in the injection line acts expansively to move the valve independently of the plunger for permitting the return flow of fuel from the injection pipe through the passage.

RALPH MILLER.
WALLACE K. NEWCOMB.